US008406462B2

(12) United States Patent
Radhakrishnan et al.

(10) Patent No.: US 8,406,462 B2
(45) Date of Patent: Mar. 26, 2013

(54) SIGNATURE DERIVATION FOR IMAGES

(75) Inventors: Regunathan Radhakrishnan, Bruno, CA (US); Claus Bauer, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 98 days.

(21) Appl. No.: 13/058,912

(22) PCT Filed: Aug. 17, 2009

(86) PCT No.: PCT/US2009/053988
§ 371 (c)(1),
(2), (4) Date: Feb. 14, 2011

(87) PCT Pub. No.: WO2010/021965
PCT Pub. Date: Feb. 25, 2010

(65) Prior Publication Data
US 2011/0142348 A1     Jun. 16, 2011

Related U.S. Application Data

(60) Provisional application No. 61/089,553, filed on Aug. 17, 2008.

(51) Int. Cl.
*G06K 9/00* (2006.01)
(52) U.S. Cl. .......................................... 382/100
(58) Field of Classification Search .......... 382/100, 382/116, 119, 169, 181, 190, 195; 348/161; 283/68, 78; 713/176, 177, 179, 180, 400, 713/500; 714/45, 732; 725/19
See application file for complete search history.

(56) References Cited

U.S. PATENT DOCUMENTS

| 6,996,273 | B2 * | 2/2006 | Mihcak et al. ............... 382/181 |
| 7,289,643 | B2 * | 10/2007 | Brunk et al. ................. 382/100 |
| 2010/0179808 | A1 | 7/2010 | Brown | |
| 2010/0238350 | A1 | 9/2010 | Radhakrishnan et al. | |
| 2010/0266168 | A1 * | 10/2010 | Wang et al. .................. 382/124 |

FOREIGN PATENT DOCUMENTS
WO    2008/143768    11/2008

OTHER PUBLICATIONS

Kozat, et al., "Robust Perceptual Image Hashing via Matrix Invariants" Proceedings of IEEE International Conference on Imaging Processing (ICIP) Singapore, Sep. 2004, pp. 3443-3446.
Mihcak, et al., "A Perceptual Audio Hashing Algorithm: A Tool for Robust Audio Identification and Information Hiding" Proceedings of 4th International Information Hiding Workshop, Pittsburgh, PA, Apr. 2001, pp. 51-65.
Venkatesan, et al., "Robust Image Hashing" Proc. IEEE ICIP, Vancouver, Canada, Sep. 2000, pp. 664-666.
Hua, et al., "Robust Video Signature Based on Ordinal Measure" 2004 International Conference on Image Processing, pp. 685-688.
Bhat, et al., "Ordinal Measures for Image Correspondence", IEEE Transactions on Pattern Analysis and Machine Intelligence, vol. 20, No. 4, Apr. 1998, pp. 415-423.
Celentano, et al., "A FFT Based Technique for Image Signature Generation" SPIE vol. 3022, pp. 457-466.
Cheung, et al., "Efficient Video Similarity Measurement with Video Signature" IEEE Transactions on Circuits and Systems for Video Technology, vol. 13, No. 1, Jan. 2003, pp. 59-74.

(Continued)

*Primary Examiner* — Abolfazl Tabatabai

(57) ABSTRACT

Deriving a fingerprint of an image corresponding to media content involves selecting at least two different regions of the same image, determining a relationship between the two regions, and deriving a fingerprint of the image based on the relationship between the two regions of the image.

26 Claims, 6 Drawing Sheets

OTHER PUBLICATIONS

Cheung, et al., "Estimation of Web Video Multiplicity" Part of the IS&T/SPIE Conference on Internet Imaging, San Jose, CA, Jan. 2000, SPIE vol. 3964, pp. 34-46.

Seo, et al., "A Robust Image Fingerprinting System Using the Radon Transform", Signal Processing: Image Communication, vol. 19, Issue 4, Apr. 2004, pp. 325-339.

Skrepth et al., "Robust Hash Functions for Visual Data: An Experimental Comparison" IbPria 2003, LNCS 2652, pp. 986-993, 2003, Springer-Verlas Berlin Heidelberg.

Schneider, et al., "A Robust Content Based Digital Signature for Image Authentication" 1996 IEEE, pp. 227-230.

Lu, et al., "Robust Mesh-Based Hashing for Copy Detection and Tracing of Images" 2004 IEEE International Conference on Multimedia and Expo, pp. 731-734.

Mihcak, et al., "New Iterative Geometric Methods for Robust Perceptual Image Hashing" LNCS 2001, pp. 13-21.

Monga, et al., "Robust Perceptual Image Hashing Using Feature Points" 2004 International Conference on Image Processing, pp. 677-680.

Johnson, et al., "Dither-based Secure Image Hashing Using Distributed Coding" Proceedings IEEE International Conference on Image Processing, Spain Sep. 2003, pp. II-751-II-754.

Swaminathan, et al., "Image Hashing Resilient to Geometric and Filtering Operations" MMSP 2004.

Lefebvre, et al., "A Robust Soft Hash Algorithm for Digital Image Signature" ICIP 2003 pp. 495-498.

Fridrich, J.; Goljan, M.; , "Robust hash functions for digital watermarking," Information Technology: Coding and Computing, 2000. Proceedings. International Conference on , vol., no., pp. 178-183, 2000.

* cited by examiner

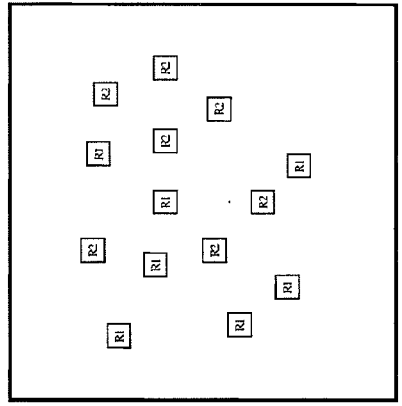
FIG. 3C
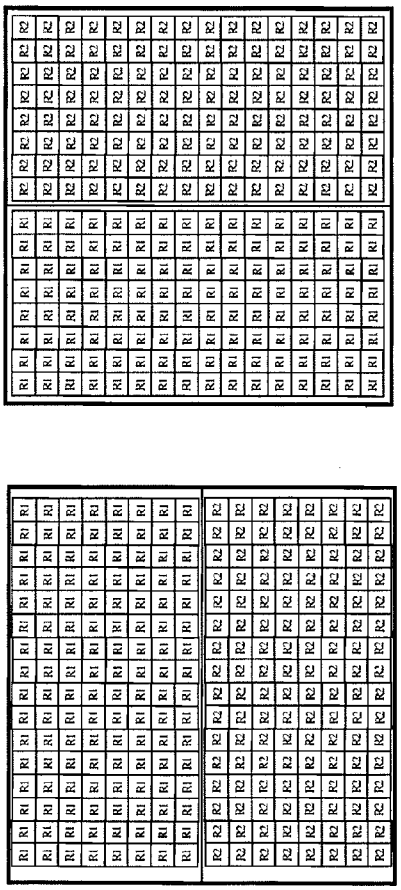
FIG. 3B
FIG. 3A
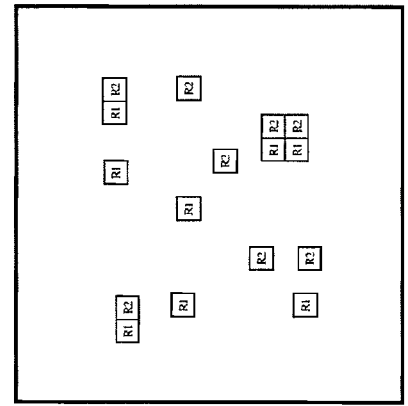
FIG. 3E
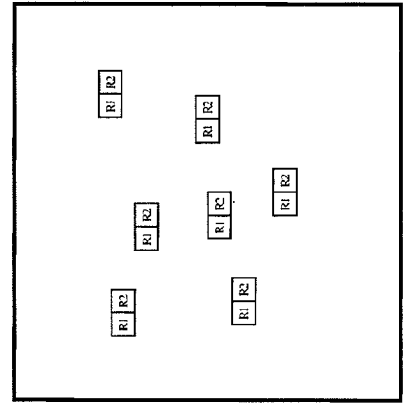
FIG. 3D

FIG. 4A

| 3 | 5 | 1 | 9 | 5 | 3 | 9 | 5 |
|---|---|---|---|---|---|---|---|
| 4 | 6 | 2 | 1 | 4 | 3 | 3 | 8 |
| 8 | 7 | 3 | 2 | 3 | 8 | 2 | 7 |
| 3 | 9 | 5 | 4 | 6 | 2 | 1 | 9 |

FIG. 4B

| R1 | R1 | R1 | R1 | R2 | R2 | R2 | R2 |
|----|----|----|----|----|----|----|----|
| R1 | R1 | R1 | R1 | R2 | R2 | R2 | R2 |
| R1 | R1 | R1 | R1 | R2 | R2 | R2 | R2 |

| -2 | 2  | -8 | 4  |
|----|----|----|----|
| 0  | 3  | -1 | -7 |
| 5  | -1 | 1  | -5 |
| -3 | 7  | 4  | -5 |

SIGNATURE DERIVATION FOR IMAGES

CROSS-REFERENCE TO RELATED APPLICATIONS

This application claims priority to U.S. Provisional Patent Application No. 61/089,553, filed 17 Aug. 2008, hereby incorporated by reference in its entirety.

TECHNOLOGY

The present invention relates generally to image signatures. More specifically, embodiments of the present invention relate to generating signatures for images that correspond to media clips.

BACKGROUND

Media clips or media content are segments of audio media, video media, or audio/visual (AV) media and include information that is embodied, stored, transmitted, received, processed, or otherwise used with at least one medium. Common media clip formats include FLV format (flash video), Windows Media Video, RealMedia, Quicktime, MPEG, MP3, and DivX. As used herein, the terms "media clips", "media content," "information content," and "content" may be used interchangeably.

Media clips may be defined with one or more images. For example, video media may be a combination of a set of temporally related frames or images at particular points in time of the video media. Additionally, audio media may be represented as one or more images using many different techniques known in the art. For example, audio information may be captured in a spectrogram. In the spectrogram, the horizontal axis can represent time, the vertical axis can represent frequency, and the amplitude of a particular frequency at a particular time can be represented in a third dimension. Further, in a two dimensional spectrogram, the amplitude may be represented with thicker lines, more intense colors or grey values. Those skilled in the art will appreciate that many different modifications to the above example and other representations may be used to represent an audio clip as an image.

Images that define media content (audio and/or video) may be associated with a corresponding fingerprint ("fingerprint" used interchangeably with and equivalent to "signature"). Some fingerprints of media content may be derived (e.g., extracted, generated) from information within, or which comprises a part of the media content. A media fingerprint embodies or captures an essence of the media content of the corresponding media and may be uniquely identified therewith. Video fingerprints are media fingerprints that may be derived from images or frames of a video clip. Audio fingerprints are media fingerprints that may be derived from images with embedded audio information (e.g., spectrograms). Further, the term media fingerprint may refer to a low bit rate representation of the media content with which they are associated and from which they are derived.

Fingerprints may be used to determine whether two media clips are identical or if a suspect media clip has been derived from the original media clip. In order to compare multiple media clips to make this determination, a fingerprint of each media clip may be derived, and thereafter the fingerprints may be compared.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A-FIG. 3E depict examples of region selection, according to embodiments of the present invention;

FIG. 4 illustrates a second example procedure, according to an embodiment of the present invention.

DESCRIPTION OF EXAMPLE EMBODIMENTS

Figure 1:
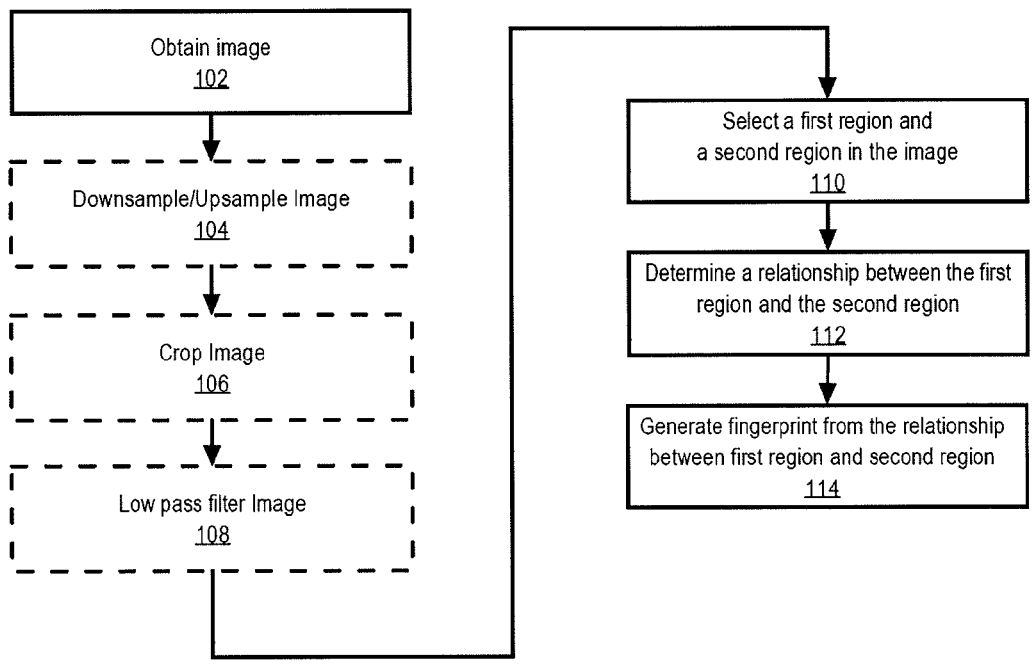
FIG. 1 depicts a first example procedure, according to an embodiment of the present invention.

The example embodiments described herein relate to deriving (e.g., extracting, generating, determining, computing) signatures for images that correspond to media clips. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Example embodiments are described herein according to the following outline:

1.0 General Overview
    2.0 Functional Overview
        2.1 Generation of a Media Fingerprint
        2.2 Example Embodiment
    3.0 Implementation Mechanisms—Hardware Overview
    4.0 Equivalents, Extensions, Alternatives, and Miscellaneous

1.0 GENERAL OVERVIEW

In an embodiment, derivation of a fingerprint of an image corresponding to media content, at least two different regions of the same image are selected. Thereafter, a relationship between the two regions is determined and a fingerprint of the image is derived based on the relationship between the two regions of the image.

Determining the relationship between the first region and the second region of the image may include: for each pixel in the first region, computing a value based on an intensity of the pixel in the first region and an intensity of a corresponding pixel in the second region to obtain a plurality of values.

Each of the plurality of values may include at least one of: a difference between an intensity of the pixel in the first region and the corresponding pixel in the second region, or a ratio between an intensity of the pixel in the first region and an intensity of the corresponding pixel in the second region.

Deriving the fingerprint of the image may include: generating a matrix based on the plurality of values, projecting the matrix onto each of a plurality of vectors to obtain a plurality of projected values, determining a signature bit for each of the plurality of projected values to obtain a plurality of signature bits, and deriving the fingerprint based on the plurality of signature bits.

Generating the matrix based on the plurality of values may include: determining a rank of each value in relation to the plurality of values, and generating the matrix using the rank of each value in the plurality of values.

Projecting the matrix onto each of a plurality of vectors to obtain a plurality of projected values may include: computing the hadamard product of the matrix and each of the plurality of vectors to obtain a plurality of matrices, and determining the plurality of projected values corresponding to the plurality of matrices based on a combination of elements in each of the plurality of matrices.

Determining a signature bit for each of the plurality of projected values may include: determining a median of the projected values, representing each of the projected values that exceed the median with a first signature bit, and representing each of the projected values that are exceeded by the median with a second signature bit.

In an embodiment, signature bits that are within a predetermined range of values from the median are classified as weak bits, wherein the weak bits are ignored when determining whether a suspect image is derived from the image or toggled when determining whether the suspect image is derived from the image.

The image may include one or more of: a video frame of a plurality of video frames, or a graphical representation of an audio clip.

In an embodiment, the image is modified, prior to selecting the first region and the second region, with one or more of: downsampling, letterbox detecting and cropping, or low pass filtering.

Determining the relationship between the first region and the second region of the image may include: partitioning pixels in the first region into a first plurality of groups, partitioning pixels in the second region into a second plurality of groups, for each group in the first plurality of groups and for each group in the second plurality of groups, determining a group intensity statistic for pixels within each of the groups, and for each group in the first region, computing a value based on the group intensity statistic of the group in the first region and the group intensity statistic of a corresponding group in the second region.

The group intensity statistic may include one or more of: an average intensity of the pixels within the group, a standard deviation of intensities of the pixels within the group, a median intensity of the intensities of the pixels within the group, a correlation associated with the intensities of the pixels within the group, or a distribution associated with the intensities of the pixels within the group.

Other embodiments of the invention may include a system and computer readable medium with functionality to execute the steps described above.

2.0 FUNCTIONAL OVERVIEW

Examples of embodiments, which relate to generating media fingerprints that correspond to media content, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Media fingerprints may be described herein with reference to one or more example media, including video and/or audio media. The selection of an example medium in this description may be made for simplicity and concise unity and, unless expressly stated to the contrary, should not be construed as limiting an embodiment to a particular medium as embodiments of the present invention are well suited to function with audio and/or video media. Furthermore, embodiments of the present invention are well suited to function with images, corresponding to media content, which may represent two or three spatial dimensions.

2.1 Generation of a Media Fingerprint

As depicted in FIG. 1, in order to derive a media fingerprint from media content, an image corresponding to the media content is first obtained (Step 102). In an embodiment, the image may be received from a program or process. In an embodiment, the image may be embedded with audio information associated with audio content. For example, a spectrogram with embedded audio information may be generated or received.

Figure 2:
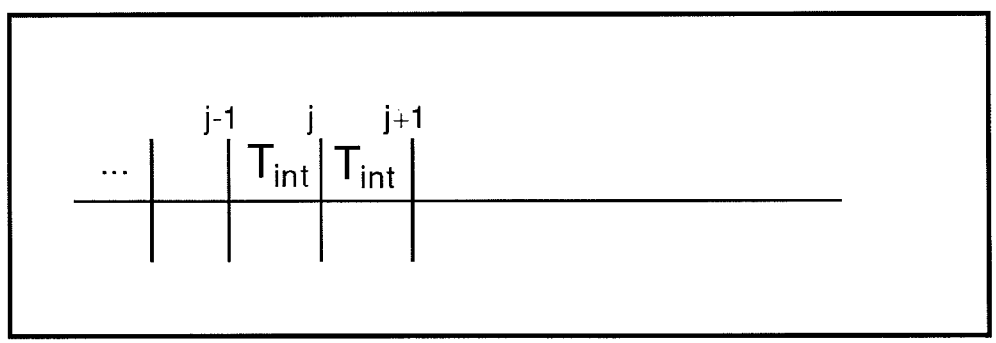
FIG. 2 depicts a segmented video clip, according to an embodiment of the present invention.

In an embodiment, one or more images may be derived from a stream of video content. The input video may be temporally downsampled to a reference frame rate, e.g., a frame rate for which the video content fingerprints remain robust. In an embodiment, downsampling to a reference frame rate prior to generation of a signature allows for comparisons of videos with varying frame rates. As depicted in FIG. 2, frames of the video sequence stream over time may be segmented into time intervals $T_{int}$, and fingerprints may be derived once per time interval $T_{int}$. For example, if the original video is at 30 fps (frames per second) and the signature is to be robust for frame rate conversion down to 12 fps, then signatures would be derived every time interval $T_{int}=1/12$ of a second. In an embodiment, the video frame closest to the time step 'j', referred to as $F_j$ may be used as the image for fingerprint generation.

Returning to FIG. 1, the obtained image may be downsampled or upsampled to a desired spatial resolution (Step 104). Downsampling of an image may be used to account for spatial resolution changes in a suspect image. For example, the frame $F_j$ may be downsampled to reference spatial resolution 120*160 from any original spatial resolution. The registration between the original video and spatially scaled video is not disturbed as long as the aspect ratio is not changed. In an embodiment, an image may be upsampled to the desired reference spatial resolution subsequent to letterbox detection and removal which may be performed by identifying a strong horizontal edge and a region of almost constant intensity values in the top of the frame. In this example, once the letterbox is detected, it may removed, and the remaining active region of the frame may be upsampled to the chosen spatial resolution (for example, 120*160). In an embodiment, the image may be cropped (Step 106) to remove a portion of the original image where text, logos, or other graphics are likely to be placed or are placed in suspect video clip. The removed portion is not used for deriving the signature and accordingly, the signature is robust against any modification to the removed region. In an embodiment, cropping prior to generation allows for generation of a fingerprint of the image that is robust against text, logos, graphics or other additions to the cropped out region.

Low-pass filtering may be performed on the image to improve the robustness of extracted features prior to derivation of the fingerprint (Step 108). Low-pass filtering allows low frequency data, or data that does not change much from pixel to neighboring pixel, to pass through, removing the high frequency data or data that changes rapidly from pixel to neighboring pixel. The visible result is the image appears blurred or smoothed. For an image that contains a lot of noise, low pass filtering would smooth out the image and reduce the noise with minimal affect on large features in the image. The amount of low-pass filtering determines the trade-off between robustness against processing and sensitivity to content. The amount of low-pass filtering could also be chosen based on the analysis of the input frame. A frame with a lot of detailed features would require a smaller amount of low-pass filtering to preserve sensitivity than would a frame without much detailed information.

After the optional image prepping steps (Steps 104, 106, and 108) described above, two or more regions in the image are selected or identified (Step 110). Region selection may be performed using many different deterministic and/or non-deterministic methods. A few examples of possible region selections are depicted in FIG. 3A-FIG. 3E, where R1 represents a first region and R2 represents a second region. As shown in FIG. 3A-FIG. 3E, each region may be contiguous or non-contiguous. Furthermore, embodiments of the invention may applied to any number of regions. For example, three regions may be identified within the image. In an embodiment, multiple region selections may be used for generating a fingerprint of the image. For example, partitioning the image into top and bottom regions, as illustrated in FIG. 3A may be used to derive a portion of the image fingerprint and further, partitioning the image into left and right regions, as illustrated in FIG. 3B may be used to derive another portion of the image fingerprint. In an embodiment, random region selection as shown in FIG. 3C may also be used to derive yet another portion of the image fingerprint.

Next, a relationship is determined between the first region and the second region (Step 112). The relationship may be determined with first, pairing each of the pixels in the first region with a corresponding pixel in the second region. For an image partitioned into more than two images, pixels in a first region may be paired with pixels in the second region and further, the pixels in the first region may also be paired with pixels in a third region. Further, embodiments of the invention may also apply to grouping of more than two pixels. For example, a pixel in a first region, a pixel in a second region, and a pixel in a third region, may all be grouped together. Once the pairing or grouping is determined, a relationship between the pixels within each pair or group is determined with computing a value based on an attribute of the pixels. Computation for a value may comprise any calculation, comparison, determination, derivation, or other suitable method(s). For example, for each pair of pixels (e.g., a pixel from a first region and a corresponding pixel from the second region), an intensity of the first pixel may be subtracted from the intensity of the second pixel to determine an intensity difference relating the two pixels. In this example, the intensity of the pixel may correspond to a gray intensity or green intensity if the image is represented using gray tones or green tones, respectively. Other colors, or combinations of colors may also be used for relating pixels from the first region to the pixels from the second region. This example is further illustrated in FIG. 4A-FIG. 4C. FIG. 4A shows the intensity values for an image scaled to a spatial resolution of 4*8 for simplicity. FIG. 4B shows a region selection within the image in which the left side of the image is selected as Region 1 (R1) and the right side of the image is selected as Region 2 (R2). Thereafter, as illustrated in FIG. 4C, to determine a relationship between R1 and R2, R2 is subtracted from R1 to obtain a set of intensity difference values shown in a 4*4 matrix. In an embodiment, determining the relationship between different regions involves determining ratios of intensities of each pixel in the first region to the intensities of corresponding pixels in the second region. In addition to intensity differences and intensity ratios, various other relationship values between pixels in different regions may be determined, such as, for example, a calculation involving a combination of intensity difference and intensity ratio between pixels from different regions. Although image intensity is used to illustrate the examples, any other value that can be derived from the image may be used. Examples include, but are not limited to, values of a intensity histogram, edge orientation histogram around each corner point, color histogram, transform domain coefficients, etc.

Next, a fingerprint for the image is derived based on the relationship between pixels in different regions (Step 114). In an embodiment, the fingerprint may be derived by computing any values from numbers representing the relationship between pixel intensities for two or more regions. For clarity, a simple example involving the difference values illustrated in FIG. 4C is described. In this example, a binary value may be determined for each of the difference values shown in FIG. 4C. Thereafter, the binary values may be concatenated to generate the signature. More complex methods may also be used to derive a signature based on the relationship between different regions. One such example of generating a signature based on the relationship between different regions is illustrated in FIG. 5.

2.2 Example Embodiment

Figure 5:
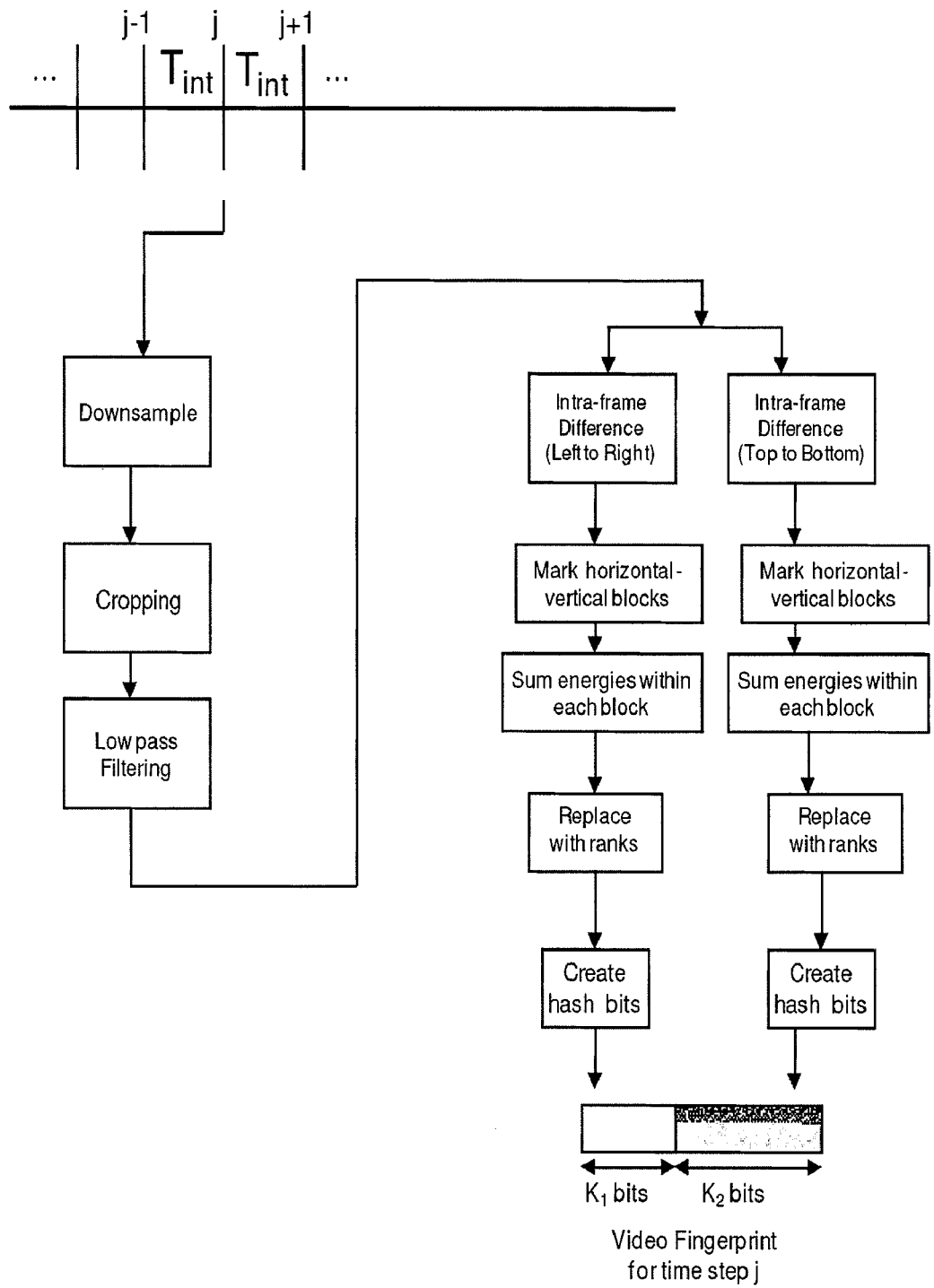
FIG. 5 illustrates a third example procedure, according to an embodiment of the present invention.

FIG. 5 illustrates one example method for generation of a signature based on the relationship between different regions of an image. One or more steps illustrated in FIG. 5 may be modified, rearranged, or omitted all together. Furthermore, the process below may be repeated to derive signature bits for different region selections (e.g., selections shown in FIG. 3A-FIG. 3E), where the signature for the image is based on a combination of the signature bits derived with using multiple region selections.

In this example, initially, an image is obtained, and spatially sampled to size 160*120 after low pass filtering, where the intensity values of the pixels are represented in a matrix $F^L_j$. Further, in this example, the relationship values are calculated with computing the difference between two pixel values separated by equal distance from the center of the image along the width. This may be described with reference to equation (1) below:

$$F^{lr}_j(m, n) = F^L_j\left(m, \frac{W}{2} - n\right) - F^L_j\left(m, \frac{W}{2} + n\right) \quad (1)$$

$$m = 1, 2 \ldots H$$

$$n = 1, 2 \ldots \frac{W}{2}$$

Here W is the width and H is the height of $F^L_j$. In this case it is 160 and 120 respectively. Accordingly, the $F^{lr}_j$ matrix is of dimensions H*W/2. Similarly, another the $F^{tb}_j$ matrix is derived by computing the difference between the top-half and the bottom-half of the $F^L_j$ matrix. Here, each element in the $F^{tb}_j$ matrix computes the difference between two pixel values separated by equal distance from the center of image along the height. This may be described with reference to equation (2) below:

$$F^{tb}_j(m, n) = F^L_j\left(\frac{H}{2} - m, n\right) - F^L_j\left(\frac{H}{2} + m, n\right) \quad (2)$$

$$m = 1, 2 \ldots \frac{H}{2}$$

$$n = 1, 2 \ldots W$$

The $F^{lr}_j$ matrix is of dimensions H*W/2 and the $F^{tb}_j$ matrix is of dimensions H/2*W. Since both of these matrices capture difference values any constant brightness change across the whole frame would affect the values in these matrices. These two matrices record the relationships between different pairs of pixels in a given image. As long as any processing on the image does not change the relationships between these pairs, these features would be preserved. In this example embodiment, the pairing of the pixels is deterministic. There may be other ways to perform pairing between the pixels to derive these matrices. Also, in general, the pairing could be based on a pseudo-random number generator as well.

Next, coarse representations Z and V of the $F^{lr}_j$ and $F^{tb}_j$ matrices are derived, respectively, with an averaging of pixel intensities in image blocks of size $W_x*W_y$. These coarse representations help achieve robustness with allowing for certain variations within a block while preserving the average within a block. The coarse representation Z of the $F^{lr}_j$ matrix is of size ($M_1*M_2$) where $M_1=W/(2*W_x)$ ($M_1=160/(2*8)=10$) and $M_2=H/W_y$ ($M_2=120/8=15$). Z is computed according to equation (3) below:

$$Z(k, l) = \frac{1}{W_x * W_y} \sum_{m=(k-1)W_x}^{kW_x} \sum_{n=(l-1)W_y}^{lW_y} F^{lr}_j(m, n) \quad (3)$$

$$k = 1, 2 \ldots M_1; \quad l = 1, 2 \ldots M_2$$

Here 'm' and 'n' represent the indices for the horizontal and vertical dimensions for the $F^{lr}_j$ matrix, 'k' and 'l' represent the indices of the image Z. Similarly, the coarse representation V of $F^{tb}_j$ is of size ($U_1*U_2$) where $U_1=(W/W_x)$ and $U_2=H/(2*W_y)$ and is computed according to equation (4), below:

$$V(k, l) = \frac{1}{W_x * W_y} \sum_{m=(k-1)W_x}^{kW_x} \sum_{n=(l-1)W_y}^{lW_y} F^{tb}_j(m, n) \quad (4)$$

$$k = 1, 2 \ldots U_1; \quad l = 1, 2 \ldots U_2$$

$$m = 1, 2 \ldots H$$

In this step, from each tile in the intra-frame difference matrices ($F^{lr}_j$ and $F^{tb}_j$) average pixel values are calculated to obtain Z and V. In general, one could compute other statistics such as the variance, standard deviation, correlation, and distribution from the tiles of these difference matrices to summarize them.

Instead of using the actual elements of the matrices Z and V for fingerprint generation, ranks are used for improved robustness. For instance, in the matrix Z, the value of its elements is replaced with its rank among all the elements. That is, if Z(0,1) element is the $4^{th}$ smallest element among all $M_1*M_2$ entries, Z(0,1) is replaced with 4. In this example, the transformed matrix which holds the ranks of elements of Z is noted as $Z_r$. Similarly, $V_r$ holds the ranks of elements of V. This step ensures robustness to changes in values of elements in Z and V as long as the rank is maintained.

Next, signature bits for the matrices $Z_r$ and $V_r$ are created using a hashing function. In this example, the signature bits are created identically for both matrices ($Z_r$ and $V_r$). Therefore, the bit creation procedure is explained for one of them, $Z_r$ and illustrated in FIG. 6. In order to derive $K_1$ bits from $Z_r$, $K_1$ vectors ($P_1, P_2 \ldots P_{K1}$) are first created and the matrix $Z_r$ is projected onto this set of $K_1$ vectors. Projecting the matrix $Z_r$ onto the set of $K_1$ vectors may include taking the Hadamard product of the matrix and each of the $K_1$ vectors to obtain a set of matrices. Thereafter, a computation related to two or more elements within each of the matrices may be used to determine a scalar value for each of the matrices. In this example, a sum of all the elements in each of the matrices is used to compute a set of projected values ($H_1, H_2 \ldots H_{K1}$). Each of these projected values ($H_1, H_2 \ldots H_{K1}$) is compared to a threshold (in this example, the median of the projected values) to derive $K_1$ hash bits. In an embodiment, the threshold may be a value-dependent threshold, e.g., computed based on the projected values $H_1, H_2 \ldots H_{K1}$, or other values generated based on the image. Examples of value-dependent threshold include median of values, average of values, predetermined percentile in range of values, etc. Accordingly, the value-dependent threshold may dynamically change based on the set of values being applied against the threshold. The threshold may also be a fixed number, a constant number, a user selected number, etc. For each projected value above the median, a first signature bit may be assigned, and for each projected value below the median, a second signature bit may be assigned. Similarly, $K_2$ hash bits are created from the matrix $V_r$.

The $K_1$ hash bits based on the set of $K_1$ vectors ($P_1, R_2 \ldots P_{K1}$) may capture different aspects of the matrix $Z_r$ as long as each of the vectors ($P_1, P_2 \ldots P_{K1}$) differ from one another. If any two of the $K_1$ vectors are identical, then 2 bits out of the $K_1$ bits may be identical. Identical bits may be avoided with use of an orthogonal basis set of $K_1$ vectors or with use of any set of different $K_1$ vectors.

Thereafter, the fingerprint of length ($K_1+K_2$) bits is derived by concatenating the two sets of hash bits $K_1$ and $K_2$ from $Z_r$ and $V_r$, respectively. Although, two relationships (e.g., top-bottom and left-right) were used to generate the signature in this example, the invention can be used with any number of deterministic and/or non-deterministic relationships, as shown in examples of FIG. 3A-FIG. 3E.

In an embodiment, a notion of weak bits may be used when comparing signatures of original and modified video using a hash table based look-up. The hash-table look-up based matching could be easily misguided with a single bit-flip in the signature of the modified content. A subset S of the signature bits derived from the modified video may be marked as weak. These bits are termed weak as they are more likely to flip than other bits, e.g., upon processing the content. Given the knowledge of these S "weak" bits, all $2^S$ possibilities may be tried while performing the hash-table look-up to find the exact hash entry of the original matching signature.

Figure 6:
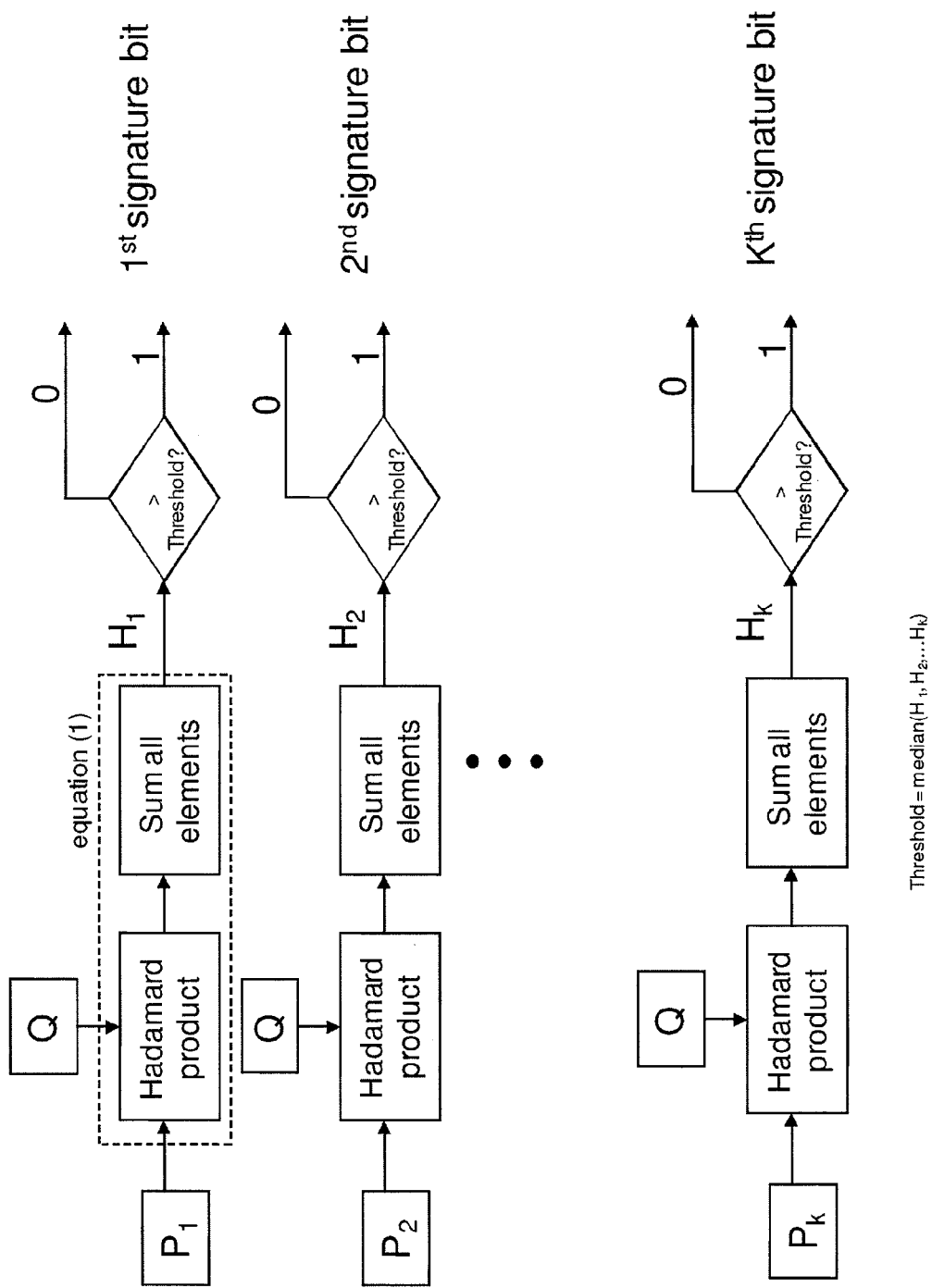
FIG. 6 illustrates a fourth example procedure, according to an embodiment of the present invention.

A method for identifying the subset of weak bits in the context of the above method of signature generation, according to an embodiment, may be described as follows. As described above, $K_1$ hash bits are derived from $Z_r$ based on projections onto $K_1$ vectors as shown in FIG. 6. These projections result in numbers $H_1, H_2 \ldots H_{K1}$. Each of these values is compared to a threshold (in this example, the median of the numbers $H_1, H_2 \ldots H_{K1}$) to derive $K_1$ hash bits. In the case of processing operations on the content, the values that are closer to the threshold may be more likely (perhaps significantly) to flip bits than other values. Based on this observation, $G_1, G_2 \ldots G_{K1}$ may be computed where $G_{(i)}$=absolute value $|H_{(i)}$–Threshold|. Here the median of these projections is used as the Threshold. Finally, $G_1, G_2 \ldots G_{K1}$ is sorted in the order of decreasing values. Then, the predicted S weak bits are those positions that are corresponding to the last S values in the sorted array. Weak bits may also be obtained with a comparison of $G_1, G_2 \ldots G_{K1}$ to another threshold. In this case, the number of weak bits may depend on this chosen threshold.

A method for comparing signatures of the original video and the modified video, based on consecutive matching bits from the strongest signature bits to the weakest signature bits, may be described as follows. Initially a set of values, each associated with signature bits is obtained for an original image of the original video. The set of values may be a set of projected values obtained as described in the methods above or other set of values derived from an image. Thereafter, the set of values is rearranged from strongest bits to weakest bits, where the strength of each bit is based on a distance of the value from a threshold used for determining the signature bit, as described above. The greater the distance a value is from the threshold, the stronger the corresponding bit. Conversely, the lower the distance a value is from the threshold, the weaker the corresponding bit. In the example below, the average of the values is used as the threshold, however any other value may be used as the threshold (e.g., median, a random number, a user selected number, etc.). In this example, a set of values ordered $H_1-H_2-H_3-H_4-H_5-H_6$ with an average of 20, the threshold, and corresponding signature bits 100110, may be as follows:

TABLE 1

| Value | Distance from Threshold 20 | Above or Below Threshold | Signature Bit | Strength/Reorder Sequence of Bits |
|---|---|---|---|---|
| $H_1$: 21 | 1 | Above | 1 | 6 |
| $H_2$: 6 | 14 | Below | 0 | 2 |
| $H_3$: 18 | 2 | Below | 0 | 5 |
| $H_4$: 39 | 19 | Above | 1 | 1 |
| $H_5$: 27 | 7 | Above | 1 | 4 |
| $H_6$: 9 | 11 | Below | 0 | 3 |

According, since the greater the distance from the threshold, the stronger the bit, the set of values $H_1-H_2-H_3-H_4-H_5-H_6$ corresponding to signature bits 100110 may be rearranged from strongest bits to weakest bits as follows: $H_4-H_2-H_6-H_5-H_3-H_1$ corresponding to signature bits 100101. Accordingly, the signature bits for the original image are rearranged from strongest bits to weakest bits.

Next, the same translation ("$H_1-H_2-H_3-H_4-H_5-H_6$" to "$H_4-H_2-H_6-H_5-H_3-H_1$") used for rearranging the signature bits for the original image is used for rearranging the signature bits for the modified image (or suspected modified image) from the modified video (or suspected modified image). A set of values $I_1-I_2-I_3-I_4-I_5-I_6$ is derived from the modified image, with an average of 40, the threshold, and the corresponding signature bits 001110 is as follows:

TABLE 2

| Value | Distance from Threshold 40 | Above or Below Threshold 40 | Signature Bit | Same Reorder Sequence |
|---|---|---|---|---|
| $I_1$: 41 | 1 | Above | 1 | 6 |
| $I_2$: 10 | 30 | Below | 0 | 2 |
| $I_3$: 41 | 1 | Above | 1 | 5 |
| $I_4$: 76 | 36 | Above | 1 | 1 |
| $I_5$: 54 | 14 | Above | 1 | 4 |
| $I_6$: 18 | 22 | Below | 0 | 3 |

However, the signature bits $I_1-I_2-I_3-I_4-I_5-I_6$ (101110) corresponding to the modified image are rearranged using the same translation, determined based on the strength of the signature bits of the original image, to obtain the sequence $I_4-I_2-I_6-I_5-I_3-I_1$ (100111) for the modified image.

Accordingly, signature bits for the original image (100101) and signature bits for the modified image (100111) are both rearranged according to the strength of the original bits in descending order with the strongest bits first and the weakest bits last.

Thereafter, the rearranged signature bits for the original image (100101) are compared to the rearranged bits for the modified image (100111) to determine the longest consecutive match. In this example, the first four consecutive bits (1001) for both signatures match. The fifth bit does not match as it is '0' for the original image and '1' for the modified image. A degree of similarity between the original image and the modified image may be then be computed based on the strongest four of the six bits that are matching.

In an embodiment, each bit may be assigned a percentage strength value based on the corresponding value's distance from the threshold. In the example described above, the signature bits of the original image may each be assigned a strength percentage based on the distance from the threshold 20 divided by the total distance from the threshold of all values. The total distance from the threshold shown in Table 1 is 54 (1+14+2+19+7+11). Thereafter each of the differences may be divided by the total 54 to determine the relative strength of the bit. Accordingly, $H_4$ the bit reordered first (the strongest bit) has a strength of 100 *19/54=35%. $H_4$, the bit ordered second has a strength of 100 *14/54=26%. $H_6$, the bit ordered third has a strength of 100 *11/54=20%. $H_5$, the bit ordered fourth has a strength of 100 *7/54=13%. $H_3$, the bit ordered fifth has a strength of 100 *2/54=4%. $H_1$, the bit ordered sixth has a strength of 100*1/54=2%. Accordingly, a degree of similarity between the original image and the modified image based on the first consecutive matching bits (first four bits in above example) is 94% (35%+26%+20%+13%). If all matching bits (not just the first consecutive matching bits) are considered the degree of similarity is 96% (35%+26%+20%+13%+2%) based on bits 1, 2, 3, 4, and 6.

In an embodiment, the robustness of a signature derivation method may be determined by comparing the first consecutive matching bits, ordered by strength, of an original image and a modified image, as described above. For example, the signature bits of an original image may be derived and ordered by strength. The original image may then be modified using a known modification such as increase in brightness to obtain a modified image. Thereafter the signature bits of the modified image may be derived and reordered according to the translation applied to the original image. Then a degree of similarity (e.g., a percentage based on strength of first consecutive matching bits as described above) may be obtained between the original image and the modified image. The higher the degree of similarity, the more robust the signature derivation method may be. Furthermore, the use consecutive matching bits ordered by strength instead of any matching bits may more accurately indicate the robustness of a signature derivation method against a particular type of modification.

Although the above example was directed to the ordering of bits for both the original image and the modified image based on the strength of the signature bits corresponding to the original image, the ordering of bits for both images may also be based on the strength of the signature bits corresponding to the modified image.

In an embodiment, each of a set of functions may be applied to a set of values determined based on the image to obtain one or more signature bits per function of the set of functions. The set of values based on the image may be used as input for each of the functions where the output for each function corresponds to one or more signature bits for a fingerprint. Accordingly, each of the signature bits within the fingerprint correspond to a function and the set of values based on the image. For example, a set of values based on the image may be used to generate a matrix and the matrix may be provided as input to each of a plurality of functions. Each of the functions may correspond to different functions (e.g., different mathematical formulas), a function with different constants (e.g., projections of the matrix onto vectors with differing values for each function), or a combination thereof. Accordingly, the same set of values may be used to determine signature bits that are based on the functions applied to the set of values.

Example embodiments of the present invention are described above in relation to media fingerprints that generally correspond to media content. In the description of example embodiments, video media have been used as an example. As described above, video media was selected as an example medium in the description above merely for simplicity and unity and, except as expressly stated to the contrary, should not be construed as limiting an embodiment to a particular medium. Embodiments of the present invention are well suited to function with audio and graphical (e.g., still, text based,) media, as well as video media.

For instance, embodiments are well suited to derive acoustic signatures and composite acoustic fingerprints (which may also be referred to as "audio" fingerprints, e.g., synonymously, interchangeably) thereof from images associated with audio media such as sound, music and speech recordings. The audio media may be associated with video media, such as a recorded soundtrack that may be encoded with video media, and/or with another multimedia format.

While video frames are used above as examples in describing media content elements, embodiments are well suited to function with audio spectrograms of an audio clip as media content clips, as well. As applied to the description above, an audio clip may thus comprise a portion of audio media content that streams over time. The above methods may be applied over a spectrogram of the audio clip to derive a corresponding acoustic fingerprint.

3.0 Implementation Mechanisms- Hardware Overview

Embodiments of the present invention, may be implemented with a computer system, systems configured in electronic circuitry and components, an integrated circuit (IC) device such as a microcontroller, a field programmable gate array (FPGA), or an application specific IC (ASIC), and/or apparatus that includes one or more of such systems, devices or components.

Figure 7:
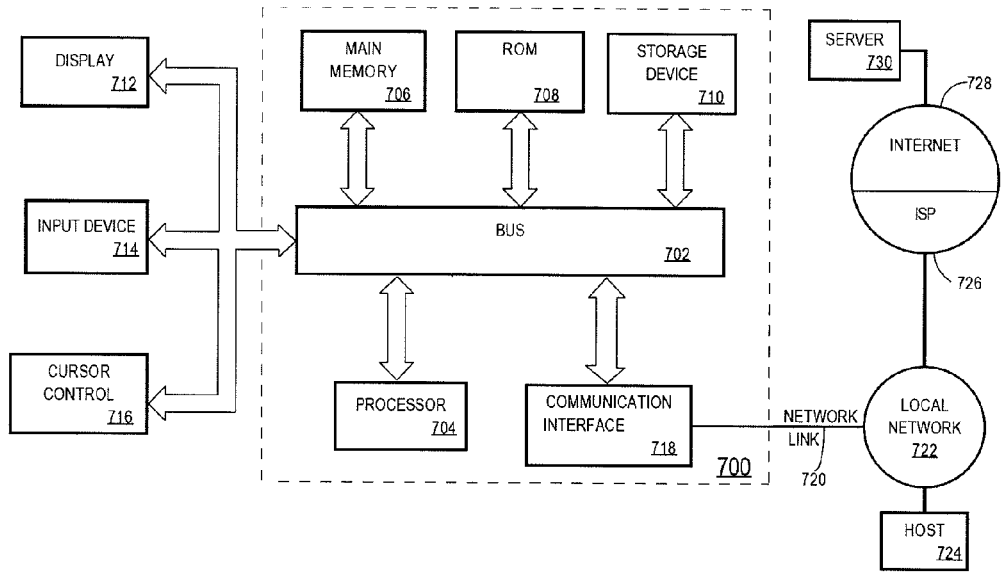
FIG. 7 depicts an example computer system platform with which an embodiment of the present invention may be implemented.

FIG. 7 depicts an example computer system platform 400, with which an embodiment of the present invention may be implemented. FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), liquid crystal display (LCD), plasma screen display, or the like, for displaying information to a computer user. An input device 714, including alphanumeric (or non-alphabet based writing systems and/or non-Arabic number based) and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), which allows the device to specify positions in a plane.

Embodiments may relate to the use of computer system 700 for implementing techniques described herein. According to an embodiment of the invention, such techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any storage medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or electromagnetic waves, such as those generated during radio-wave and infra-red and other optical data communications. Such media are tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, other legacy media or any other physical medium with patterns of holes or darkened spots, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a digital subscriber line (DSL) or cable modem (traditionally modulator/demodulator) to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

Figure 8:
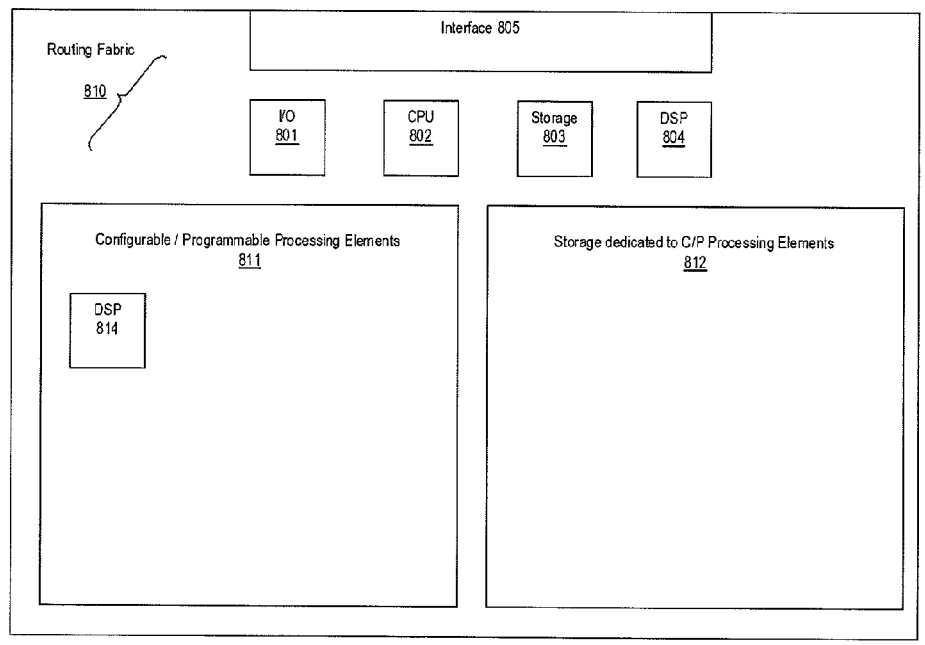
FIG. 8 depicts an example integrated circuit device, with which an embodiment of the present invention may be implemented.

FIG. 8 depicts an example IC device 800, with which an embodiment of the present invention may be implemented. IC device 800 may have an input/output (I/O) feature 801. I/O feature 801 receives input signals and routes them via routing fabric 810 to a central processing unit (CPU) 802, which functions with storage 803. I/O feature 801 also receives output signals from other component features of IC device 800 and may control a part of the signal flow over routing fabric 810. A digital signal processing (DSP) feature performs at least function relating to digital signal processing. An interface 805 accesses external signals and routes them to I/O feature 801, and allows IC device 800 to export signals. Routing fabric 810 routes signals and power between the various component features of IC device 800.

Configurable and/or programmable processing elements (CPPE) 811, such as arrays of logic gates may perform dedicated functions of IC device 800, which in an embodiment may relate to deriving and processing media fingerprints that generally correspond to media content. Storage 812 dedicates sufficient memory cells for CPPE 811 to function efficiently. CPPE may include one or more dedicated DSP features 814.

An embodiment of the present invention may relate to one or more of the example embodiments enumerated below.

1. A method, comprising:
 selecting a first region and a second region of the image;
 determining a relationship between the first region and the second region of the image; and
 deriving a fingerprint of the image based on the relationship between the first region and the second region of the image.

2. The method as recited in enumerated example embodiment 1, wherein determining the relationship between the first region and the second region of the image comprises:
for each pixel in the first region, computing a value based on an intensity of the pixel in the first region and an intensity of a corresponding pixel in the second region to obtain a plurality of values.

3. The method as recited in enumerated example embodiment 2, wherein each of the plurality of values comprises at least one of:
 a difference between an intensity of the pixel in the first region and the corresponding pixel in the second region; or
 a ratio between an intensity of the pixel in the first region and an intensity of the corresponding pixel in the second region.

4. The method as recited in enumerated example embodiment 2, wherein deriving the fingerprint of the image comprises:
 generating a matrix based on the plurality of values;
 projecting the matrix onto each of a plurality of vectors to obtain a plurality of projected values;
 determining a signature bit for each of the plurality of projected values to obtain a plurality of signature bits; and
 deriving the fingerprint based on the plurality of signature bits.

5. The method as recited in enumerated example embodiment 4, wherein generating the matrix based on the plurality of values comprises:
 determining a rank of each value in relation to the plurality of values; and
generating the matrix using the rank of each value in the plurality of values.

6. The method as recited in enumerated example embodiment 4, wherein projecting the matrix onto each of a plurality of vectors to obtain the plurality of projected values comprises:

computing a Hadamard product of the matrix and each of the plurality of vectors to obtain a plurality of matrices; and determining the plurality of projected values corresponding to the plurality of matrices based on a combination of elements in each of the plurality of matrices.

7. The method as recited in enumerated example embodiment 4, wherein determining a signature bit for each of the plurality of projected values comprises:
determining a threshold;
representing each of the projected values that exceed the threshold with a first signature bit; and
representing each of the projected values that are exceeded by the threshold with a second signature bit.

8. The method as recited in enumerated example embodiment 7, wherein the threshold comprises a value-dependent threshold based on the projected values, and wherein the value-dependent threshold comprises:
a median of the projected values;
an average of the projected values; or
a value at a predetermined percentile of a range of the projected values.

9. The method as recited in enumerated example embodiment 7, further comprising:
classifying signature bits that are within a predetermined range of values from the threshold as weak bits,
wherein the weak bits are:
ignored when determining whether a suspect image is derived from the image; or
toggled when determining whether the suspect image is derived from the image.

10. The method as recited in enumerated example embodiment 1, wherein the image comprises one or more of:
a video frame of a plurality of video frames;
a graphical representation of an audio clip; or
a standalone image.

11. The method as recited in enumerated example embodiment 1, wherein the image is modified, prior to selecting the first region and the second region, with one or more of:
downsampling;
letterbox detecting and cropping; or
low pass filtering.

12. The method as recited in enumerated example embodiment 1, wherein determining the relationship between the first region and the second region of the image comprises:
partitioning pixels in the first region into a first plurality of groups;
partitioning pixels in the second region into a second plurality of groups;
for each group in the first plurality of groups and for each group in the second plurality of groups, determining a group intensity statistic for pixels within each of the groups; and
for each group in the first region, computing a value based on the group intensity statistic of the group in the first region and the group intensity statistic of a corresponding group in the second region.

13. The method as recited in enumerated example embodiment 12, wherein the group intensity statistic comprises one or more of:
an average intensity of the pixels within the group;
a standard deviation of intensities of the pixels within the group;
a median intensity of the intensities of the pixels within the group;
a correlation associated with the intensities of the pixels within the group; or
a distribution associated with the intensities of the pixels within the group.

14. A system, comprising:
at least one processor, and
a computer readable storage medium with one or more sequences of stored instructions, which when executed with the processor, cause the processor to perform the steps of:
selecting a first region and a second region of the image;
determining a relationship between the first region and the second region of the image; and
deriving a fingerprint of the image based on the relationship between the first region and the second region of the image.

15. The system as recited in enumerated example embodiment 14, wherein determining the relationship between the first region and the second region of the image comprises:
for each pixel in the first region, computing a value based on an intensity of the pixel in the first region and an intensity of a corresponding pixel in the second region to obtain a plurality of values.

16. The system as recited in enumerated example embodiment 15, wherein each of the plurality of values comprise one or more of:
a difference between an intensity of the pixel in the first region and the corresponding pixel in the second region; or
a ratio between an intensity of the pixel in the first region and an intensity of the corresponding pixel in the second region.

17. The system as recited in enumerated example embodiment 15, wherein deriving the fingerprint of the image comprises:
generating a matrix based on the plurality of values;
projecting the matrix onto each of a plurality of vectors to obtain a plurality of projected values;
determining a signature bit for each of the plurality of projected values to obtain a plurality of signature bits; and
deriving the fingerprint based on the plurality of signature bits.

18. The system as recited in enumerated example embodiment 17, wherein generating the matrix based on the plurality of values comprises:
determining a rank of each value in relation to the plurality of values; and generating the matrix using the rank of each value in the plurality of values.

19. The system as recited in enumerated example embodiment 17, wherein projecting the matrix onto each of a plurality of vectors to obtain the plurality of projected values comprises:
computing a Hadamard product of the matrix and each of the plurality of vectors to obtain a plurality of matrices; and
determining the plurality of projected values corresponding to the plurality of matrices based on a combination of elements in each of the plurality of matrices.

20. The system as recited in enumerated example embodiment 17, wherein determining a signature bit for each of the plurality of projected values comprises:
determining a threshold;
representing each of the projected values that exceed the threshold with a first signature bit; and
representing each of the projected values that are exceeded by the threshold with a second signature bit.

21. The system as recited in enumerated example embodiment 20, wherein the threshold comprises a value-dependent threshold based on the projected values, and wherein the value-dependent threshold comprises:
a median of the projected values;
an average of the projected values; or
a value at a predetermined percentile of a range of the projected values.

22. The system as recited in enumerated example embodiment 20, wherein the one or more sequences of instructions, when executed with the processor, cause the processor to further perform the step of:
classifying signature bits that are within a predetermined range of values from the threshold as weak bits,
wherein the weak bits are:
ignored when determining whether a suspect image is derived from the image; or
toggled when determining whether the suspect image is derived from the image.

23. The system as recited in enumerated example embodiment 14, wherein the image comprises one or more of:
a video frame of a plurality of video frames;
a graphical representation of an audio clip; or
a standalone image.

24. The system as recited in enumerated example embodiment 14, wherein the image is modified, prior to selecting the first region and the second region, with one or more of:
downsampling;
letterbox detecting and cropping; or
low pass filtering.

25. The system as recited in enumerated example embodiment 14, wherein determining the relationship between the first region and the second region of the image comprises:
partitioning pixels in the first region into a first plurality of groups;
partitioning pixels in the second region into a second plurality of groups;
for each group in the first plurality of groups and for each group in the second plurality of groups, determining a group intensity statistic for pixels within each of the groups; and
for each group in the first region, computing a value based on the group intensity statistic of the group in the first region and the group intensity statistic of a corresponding group in the second region.

26. The system as recited in enumerated example embodiment 25, wherein the group intensity statistic comprises one or more of:
an average intensity of the pixels within the group;
a standard deviation of intensities of the pixels within the group;
a median intensity of the intensities of the pixels within the group;
a correlation associated with the intensities of the pixels within the group; or
a distribution associated with the intensities of the pixels within the group.

27. A computer readable storage medium having encoded instructions which, when executed by one or more processors, cause the one or more processors to perform the steps of:
selecting a first region and a second region of the image;
determining a relationship between the first region and the second region of the image; and
deriving a fingerprint of the image based on the relationship between the first region and the second region of the image.

28. The computer readable storage medium as recited in enumerated example embodiment 27, wherein determining the relationship between the first region and the second region of the image comprises:
for each pixel in the first region, computing a value based on an intensity of the pixel in the first region and an intensity of a corresponding pixel in the second region to obtain a plurality of values.

29. The computer readable storage medium as recited in enumerated example embodiment 28, wherein each of the plurality of values comprises at least one of:
a difference between an intensity of the pixel in the first region and the corresponding pixel in the second region; or
a ratio between an intensity of the pixel in the first region and an intensity of the corresponding pixel in the second region.

30. The computer readable storage medium as recited in enumerated example embodiment 28, wherein deriving the fingerprint of the image comprises:
generating a matrix based on the plurality of values;
projecting the matrix onto each of a plurality of vectors to obtain a plurality of projected values;
determining a signature bit for each of the plurality of projected values to obtain a plurality of signature bits; and
deriving the fingerprint based on the plurality of signature bits.

31. The computer readable storage medium as recited in enumerated example embodiment 30, wherein generating the matrix based on the plurality of values comprises:
determining a rank of each value in relation to the plurality of values; and
generating the matrix using the rank of each value in the plurality of values.

32. The computer readable storage medium as recited in enumerated example embodiment 30, wherein projecting the matrix onto each of the plurality of vectors to obtain a plurality of projected values comprises:
computing a Hadamard product of the matrix and each of the plurality of vectors to obtain a plurality of matrices; and
determining the plurality of projected values corresponding to the plurality of matrices based on a combination of elements in each of the plurality of matrices.

33. The computer readable storage medium as recited in enumerated example embodiment 30, wherein determining a signature bit for each of the plurality of projected values comprises:
determining a threshold;
representing each of the projected values that exceed the threshold with a first signature bit; and
representing each of the projected values that are exceeded by the threshold with a second signature bit.

34. The computer readable storage medium as recited in enumerated example embodiment 33, wherein the threshold comprises a value-dependent threshold based on the projected values, and wherein the value-dependent threshold comprises:
a median of the projected values;
an average of the projected values; or
a value at a predetermined percentile of a range of the projected values.

35. The computer readable storage medium as recited in enumerated example embodiment 33, wherein the encoded instructions, when executed by one or more processors, cause the one or more processors to further perform the step of:

classifying signature bits that are within a predetermined range of values from the threshold as weak bits,
  wherein the weak bits are:
    ignored when determining whether a suspect image is derived from the image; or
  toggled when determining whether the suspect image is derived from the image.

36. The computer readable storage medium as recited in enumerated example embodiment 27, wherein the image comprises one or more of:
  a video frame of a plurality of video frames;
  a graphical representation of an audio clip; or
  a standalone image.

37. The computer readable storage medium as recited in enumerated example embodiment 27, wherein the image is modified, prior to selecting the first region and the second region, by one or more of:
  downsampling;
  letterbox detecting and cropping; or
  low pass filtering.

38. The computer readable storage medium as recited in enumerated example embodiment 27, wherein determining the relationship between the first region and the second region of the image comprises:
  partitioning pixels in the first region into a first plurality of groups;
  partitioning pixels in the second region into a second plurality of groups;
  for each group in the first plurality of groups and for each group in the second plurality of groups, determining a group intensity statistic for pixels within each of the groups; and
  for each group in the first region, computing a value based on the group intensity statistic of the group in the first region and the group intensity statistic of a corresponding group in the second region.

39. The computer readable storage medium as recited in enumerated example embodiment 38, wherein the group intensity statistic comprises one or more of:
  an average intensity of the pixels within the group;
  a standard deviation of intensities of the pixels within the group;
  a median intensity of the intensities of the pixels within the group;
  a correlation associated with the intensities of the pixels within the group; or
  a distribution associated with the intensities of the pixels within the group.

40. A method, comprising the steps of:
  deriving a first signature from a first image, wherein the first signature comprises a first plurality of signature bits;
  assigning a bit strength to each of the first plurality of signature bits based on a reliability of the bit;
  deriving a second signature from a second image, wherein the second signature comprises second plurality of signature bits;
  comparing the first plurality of bits, in order from strongest to weakest, to corresponding bits in the second plurality of bits until a non-matching bit is identified to determine a plurality of reliable matching bits of the first plurality of bits;
  determining a degree of similarity between the first image and the second image based on the reliable matching bits of the first plurality of bits.

41. The method as recited in enumerated example embodiment 40, wherein comparing the first plurality of bits, in order from strongest to weakest, to corresponding bits in the second plurality of bits until a non-matching bit is identified to determine a plurality of reliable matching bits of the first plurality of bits comprises:
  rearranging the first plurality of signature bits from strongest bits to weakest bits to obtain a rearranged first plurality of signature bits; and
  comparing the rearranged first plurality of signature bits to originally corresponding bits in the second plurality of signature bits to determine consecutively matching bits in the first plurality of bits.

42. The method as recited in enumerated example embodiment 40, wherein the strength of each of the first plurality of bits is computed with:
  for each of the first plurality of signature bits, determining a distance from a corresponding value to a threshold used for determining the signature bit, and
  assigning a strength to each of the first plurality of bits proportional to the distance from the corresponding value to the threshold.

43. The method as recited in enumerated example embodiment 40, further comprising:
  modifying the first image to obtain the second image using a predetermined modification; and
  determining a robustness of a signature derivation method, used to derive the first signature and the second signature, against the predetermined modification based on the degree of similarity between the first image and the second image.

44. A method, comprising the steps of:
  deriving a first signature derived based on a first image;
  deriving a first plurality of signature bits from the first image, wherein each of the first plurality of signature bits correspond to a value generated based on the first image; and
  assigning a strength to each of the first plurality of bits proportional to a distance from the corresponding value to a threshold used for determining the signature bit;
  comparing the first signature derived based on the first image to a second signature derived based on a second image to determine a plurality of matching bits; and
  determining a degree of similarity between the first image and the second image based on the strength of the plurality of matching bits from the first plurality of bits.

45. The method as recited in enumerated example embodiment 44, further comprising:
  modifying the first image to obtain the second image using a predetermined modification; and
  determining a robustness of a signature derivation method, used to derive the first signature and the second signature, against the predetermined modification based on the degree of similarity between the first image and the second image.

46. The method as recited in enumerated example embodiment 44, further comprising:
  modifying the first image to obtain the second image using a predetermined modification; and
  determining a robustness of a signature derivation method, used to derive the first signature and the second signature, against the predetermined modification based on the degree of similarity between the first image and the second image.

47. A method, comprising the steps of:
   generating a plurality of values based on an image;
   determining a value-dependent threshold based on the plurality of values; determining a signature bit for each of the plurality of projected values to obtain a plurality of signature bits with:
   representing each of the plurality of values that exceed the value-dependent threshold with a first signature bit; and
   representing each of the projected values that are exceeded by the value-dependent threshold with a second signature bit; and
   deriving a fingerprint of the image based on the plurality of signature bits.

48. The method as recited in enumerated example embodiment 47, wherein the value-dependent threshold comprises one or more of:
   a median of the plurality of values;
   an average of the plurality of values; or
   a value at a predetermined percentile of a range of the plurality of values.

49. The method as recited in enumerated example embodiment 47, further comprising:
   classifying signature bits that are within a predetermined range of values from the value-dependent threshold as weak bits,
   wherein the weak bits are:
   ignored when determining whether a suspect image is derived from the image; or
   toggled when determining whether the suspect image is derived from the image.

50. A method, comprising the steps of:
   generating a plurality of values based on an image;
   applying each of a plurality of functions to the plurality of values to obtain one or more signature bits per function of the plurality of functions; and
   generating a fingerprint of the image based on the obtained signature bits.

51. The method as recited in enumerated example embodiment 50, wherein applying each of a plurality of functions to the plurality of values to obtain one or more signature bits per function comprises:
   generating a matrix based on the plurality of values;
   applying each of the plurality of functions to the matrix to obtain a plurality of function values; and
   determining a signature bit for each of the plurality of function values to obtain a plurality of signature bits.

52. The method as recited in enumerated example embodiment 51, wherein applying each of the plurality of functions to the matrix to obtain a plurality of function values comprises:
   projecting the matrix onto each of a plurality of vectors to obtain a plurality of projected values.

53. The method as recited in enumerated example embodiment 51, wherein generating the matrix based on the plurality of values comprises:
   determining a rank of each value in relation to the plurality of values; and
   generating the matrix using the rank of each value in the plurality of values.

54. The method as recited in enumerated example embodiment 51, wherein determining the signature bit for each of the plurality of function values to obtain the plurality of signature bits comprises:
   representing each of the plurality of values that exceed a threshold with a first signature bit; and
   representing each of the projected values that are exceeded by the threshold with a second signature bit.

55. The method as recited in enumerated example embodiment 54, further comprising:
   classifying signature bits that are within a predetermined range of values from the threshold as weak bits,
   wherein the weak bits are:
   ignored when determining whether a suspect image is derived from the image; or
   toggled when determining whether the suspect image is derived from the image.

4.0 Equivalents, Extensions, Alternatives And Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   selecting a first region and a second region of an image;
   computing a plurality of values by computing, for each pixel in the first region, a value based on an intensity of the pixel in the first region and an intensity of a corresponding pixel in the second region; and
   deriving a fingerprint of the image based on the plurality of values, comprising:
      generating a matrix based on the plurality of values;
      obtaining a plurality of projected values, wherein obtaining each projected value comprises:
         multiplying each element of the matrix with each element of a vector from a plurality of vectors to obtain a plurality of product values; and
         performing a calculation on two or more of the product values to obtain the projected value;
      determining a signature bit for each of the plurality of projected values to obtain a plurality of signature bits; and
      deriving the fingerprint based on the plurality of signature bits.

2. The method as recited in claim 1, wherein each of the plurality of values comprises at least one of:
   a difference between an intensity of the pixel in the first region and the corresponding pixel in the second region; or
   a ratio between an intensity of the pixel in the first region and an intensity of the corresponding pixel in the second region; or
   a combination of a difference and a ratio between an intensity of the pixel in the first region and an intensity of the corresponding pixel in the second region.

3. The method as recited in claim 1, wherein generating the matrix based on the plurality of values comprises:
   determining a rank of each value in relation to the plurality of values; and
   generating the matrix using the rank of each value in the plurality of values.

4. The method as recited in claim 1, wherein determining a signature bit for each of the plurality of projected values comprises:

determining a threshold;
representing each of the projected values that exceed the threshold with a first signature bit; and
representing each of the projected values that are exceeded by the threshold with a second signature bit.

5. The method as recited in claim 4, wherein the threshold comprises a value-dependent threshold based on the projected values, and wherein the value-dependent threshold comprises:
a median of the projected values;
an average of the projected values; or
a value at a predetermined percentile of a range of the projected values.

6. The method as recited in claim 4, further comprising:
classifying signature bits that are within a predetermined range of values from the threshold as weak bits,
wherein the weak bits are:
ignored when determining whether a suspect image is derived from the image; or
toggled when determining whether the suspect image is derived from the image.

7. The method as recited in claim 1, wherein the image comprises one or more of:
a video frame of a plurality of video frames;
a graphical representation of an audio clip; or
a standalone image.

8. The method as recited in claim 1, wherein the image is modified, prior to selecting the first region and the second region, with one or more of:
downsampling;
letterbox detecting and cropping; or
low pass filtering.

9. The method as recited in claim 1, comprising:
partitioning the pixels in the first region into a first plurality of groups;
partitioning the pixels in the second region into a second plurality of groups; and
for each group in the first plurality of groups and for each group in the second plurality of groups, determining a group intensity statistic for pixels within each of the groups; wherein
the computing of the plurality of values comprises computing, for each group in the first region, the value based on the group intensity statistic of the group in the first region and the group intensity statistic of a corresponding group in the second region, instead of computing, for each pixel in the first region, the value based on an intensity of the pixel in the first region and an intensity of a corresponding pixel in the second region.

10. The method as recited in claim 9, wherein the group intensity statistic comprises one or more of:
an average intensity of the pixels within the group;
a standard deviation of intensities of the pixels within the group;
a median intensity of the intensities of the pixels within the group;
a correlation associated with the intensities of the pixels within the group; or
a distribution associated with the intensities of the pixels within the group.

11. The method as recited in claim 1, executed for a first image and a second image, the method comprising:
deriving a first signature from the first image, wherein the first signature comprises a first plurality of signature bits;
assigning a bit strength to each of the first plurality of signature bits based on a reliability of the bit;
deriving a second signature from the second image, wherein the second signature comprises a second plurality of signature bits;
comparing the first plurality of bits, in order from strongest to weakest, to corresponding bits in the second plurality of bits until a non-matching bit is identified to determine a plurality of reliable matching bits of the first plurality of bits;
determining a degree of similarity between the first image and the second image based on the reliable matching bits of the first plurality of bits.

12. The method as recited in claim 1, comprising:
assigning a strength to each of the plurality of signature bits proportional to a distance from the corresponding projected value to a threshold used for determining the signature bit.

13. The method of claim 12, comprising:
comparing the plurality of signature bits derived based on the image to a further plurality of signature bits derived based on a further image to determine a plurality of matching bits; and
determining a degree of similarity between the image and the further image based on the strength of the plurality of matching bits from the plurality of signature bits.

14. The method as recited in any one of claims 1-3, comprising:
determining a value-dependent threshold based on the plurality of projected values;
representing each of the plurality of projected values that exceed the value-dependent threshold with a first signature bit; and
representing each of the plurality of projected values that are exceeded by the value-dependent threshold with a second signature bit.

15. The method as recited in claim 1, further comprising:
selecting a third region and a fourth region of the image;
computing a plurality of further values by computing, for each pixel in the third region, a value based on an intensity of the pixel in the third region and an intensity of a corresponding pixel in the fourth region;
wherein the deriving of the fingerprint of the image is based on the plurality of values and the plurality of further values, and the deriving further comprises:
generating a further matrix based on the plurality of further values;
obtaining a plurality of further projected values, wherein obtaining each further projected value comprises:
multiplying each element of the further matrix with each element of a vector from a plurality of vectors to obtain a plurality of further product values; and
performing a calculation on two or more of the further product values to obtain the further projected value;
determining a further signature bit for each of the plurality of further projected values to obtain a plurality of further signature bits; and
obtaining the fingerprint of the image based on a combination of the plurality of signature bits and the plurality of further signature bits.

16. The method as recited in claim 15, wherein the first and second regions represent a different region selection than the third and fourth regions.

17. The method as recited in claim 15, wherein the first and second regions of the image form a partition of the image into a left region and a right region, and wherein the third and fourth regions of the image form a partition of the image into a top region and a bottom region.

18. A method, comprising:
- selecting a first region and a second region of an image;
- determining a relationship between the first region and the second region of the image;
- deriving a first plurality of signature bits of the image based on the relationship between the first region and the second region of the image;
- selecting a third region and a fourth region of the image;
- determining a relationship between the third region and the fourth region of the image;
- deriving a second plurality of signature bits of the image based on the relationship between the third region and the fourth region of the image; and
- obtaining a fingerprint of the image based on a combination of the first plurality of signature bits and the second plurality of signature bits.

19. The method as recited in claim 18, wherein the first and second regions represent a different region selection than the third and fourth regions.

20. The method as recited in claim 18, wherein the first and second regions of the image form a partition of the image into a left region and a right region, and wherein the third and fourth regions of the image form a partition of the image into a top region and a bottom region.

21. A system, comprising:
- at least one processor, and
- a computer readable storage medium with one or more sequences of stored instructions which, when executed with the processor, cause the processor to perform or execute a process, the process comprising the steps of
- selecting a first region and a second region of an image;
- determining a relationship between the first region and the second region of the image;
- deriving a first plurality of signature bits of the image based on the relationship between the first region and the second region of the image;
- selecting a third region and a fourth region of the image;
- determining a relationship between the third region and the fourth region of the image;
- deriving a second plurality of signature bits of the image based on the relationship between the third region and the fourth region of the image; and
- obtaining a fingerprint of the image based on a combination of the first plurality of signature bits and the second plurality of signature bits.

22. A computer readable storage medium product having encoded instructions which, when executed by one or more processors, cause the one or more processors to perform or execute a process, the process comprising the steps of:
- selecting a first region and a second region of an image;
- determining a relationship between the first region and the second region of the image;
- deriving a first plurality of signature bits of the image based on the relationship between the first region and the second region of the image;
- selecting a third region and a fourth region of the image;
- determining a relationship between the third region and the fourth region of the image;
- deriving a second plurality of signature bits of the image based on the relationship between the third region and the fourth region of the image; and
- obtaining a fingerprint of the image based on a combination of the first plurality of signature bits and the second plurality of signature bits.

23. A system, comprising:
- at least one processor, and
- a computer readable storage medium with one or more sequences of stored instructions which, when executed with the processor, cause the processor to perform or execute a process, the process comprising the steps of:
- selecting a first region and a second region of an image;
- computing a plurality of values by computing, for each pixel in the first region, a value based on an intensity of the pixel in the first region and an intensity of a corresponding pixel in the second region; and
- deriving a fingerprint of the image based on the plurality of values, comprising:
  - generating a matrix based on the plurality of values;
  - obtaining a plurality of projected values, wherein obtaining each projected value comprises:
    - multiplying each element of the matrix with each element of a vector from a plurality of vectors to obtain a plurality of product values; and
    - performing a calculation on two or more of the product values to obtain the projected value;
  - determining a signature bit for each of the plurality of projected values to obtain a plurality of signature bits; and
  - deriving the fingerprint based on the plurality of signature bits.

24. A computer readable storage medium product having encoded instructions which, when executed by one or more processors, cause the one or more processors to perform or execute a process, the process comprising the steps of:
- selecting a first region and a second region of an image;
- computing a plurality of values by computing, for each pixel in the first region, a value based on an intensity of the pixel in the first region and an intensity of a corresponding pixel in the second region; and
- deriving a fingerprint of the image based on the plurality of values, comprising:
  - generating a matrix based on the plurality of values;
  - obtaining a plurality of projected values, wherein obtaining each projected value comprises:
    - multiplying each element of the matrix with each element of a vector from a plurality of vectors to obtain a plurality of product values; and
    - performing a calculation on two or more of the product values to obtain the projected value;
  - determining a signature bit for each of the plurality of projected values to obtain a plurality of signature bits; and
  - deriving the fingerprint based on the plurality of signature bits.

25. A system, comprising:
- means for selecting a first region and a second region of an image;
- means for computing a plurality of values by computing, for each pixel in the first region, a value based on an intensity of the pixel in the first region and an intensity of a corresponding pixel in the second region; and
- means for deriving a fingerprint of the image based on the plurality of values, wherein the fingerprint deriving means comprises:
  - means for generating a matrix based on the plurality of values;
  - means for obtaining a plurality of projected values, wherein the obtaining means comprises:
    - means for multiplying each element of the matrix with each element of a vector from a plurality of vectors to obtain a plurality of product values; and means for performing a calculation on two or more of the product values to obtain the projected value;

means for determining a signature bit for each of the plurality of projected values to obtain a plurality of signature bits; and means for deriving the fingerprint based on the plurality of signature bits.

26. A system, comprising:

means for selecting a first region and a second region of an image;

means for determining a relationship between the first region and the second region of the image;

means for deriving a first plurality of signature bits of the image based on the relationship between the first region and the second region of the image;

means for selecting a third region and a fourth region of the image;

means for determining a relationship between the third region and the fourth region of the image;

means for deriving a second plurality of signature bits of the image based on the relationship between the third region and the fourth region of the image; and means for obtaining a fingerprint of the image based on a combination of the first plurality of signature bits and the second plurality of signature bits.

* * * * *